United States Patent [19]

Gouvernelle et al.

[11] Patent Number: 4,791,532
[45] Date of Patent: Dec. 13, 1988

[54] CAPACITOR ANODE AND METHOD

[75] Inventors: Didier Gouvernelle, Semblancay; Daniel Gatesoupe, Joue Les Tours, both of France

[73] Assignee: Sprague Electric Company, North Adams, Mass.

[21] Appl. No.: 58,472

[22] Filed: Jun. 5, 1987

[30] Foreign Application Priority Data

Jul. 1, 1985 [FR] France .................. 86 09530

[51] Int. Cl.$^4$ .............................. H01G 9/00
[52] U.S. Cl. .................... 361/529; 29/570.1
[58] Field of Search ............ 361/307, 306, 433 T, 361/433 C, 433 S, 433 A; 29/880, 875, 570.1; 419/2, 8

[56] References Cited

U.S. PATENT DOCUMENTS

| 3,403,303 | 9/1968 | Klein | 419/2 X |
| 3,516,150 | 6/1970 | Leech | 29/570 |
| 3,864,827 | 2/1975 | Schreiner et al. | 29/875 |
| 4,162,518 | 7/1975 | Curlis | 361/433 |
| 4,214,293 | 7/1980 | Sterling et al. | 29/570.1 X |
| 4,299,627 | 11/1981 | Shinohara et al. | 419/8 |
| 4,347,551 | 8/1982 | Tanaka | 361/307 |
| 4,520,430 | 5/1985 | Long et al. | 361/433 |

FOREIGN PATENT DOCUMENTS

| 1051982 | 8/1959 | Fed. Rep. of Germany . |
| 2641899 | 5/1977 | Fed. Rep. of Germany . |
| 3106336 | 9/1982 | Fed. Rep. of Germany ...... 361/307 |

Primary Examiner—Donald A. Griffin

[57] ABSTRACT

A porous tantalum body is pressed with a cavity compacted locally, and a connection wire is joined to the tantalum body within the cavity.

3 Claims, 2 Drawing Sheets 4,791,532

CAPACITOR ANODE AND METHOD

BACKGROUND OF THE INVENTION

This invention concerns the manufacture of a tantalum capacitor anode, and more specifically the manufacture of the anode of such a capacitor having a connection wire extending therefrom.

Tantalum capacitors are notably described in copending U.S. patent application Ser. No. 933,404 filed Nov. 21, 1986 concerning a process for manufacturing a tantalum capacitor with a solid electrolyte with neither wire not output ribbon (known as a chip capacitor), a device adapted to its implementation and a capacitor thus obtained.

As is known, such a chip capacitor is a surface mount component taking the form of a short bar on the ends of which are deposited two conductive layers insulated from each other; one of these layers is connected electrically by a rod of tantalum to a porous tantalum core covered with a dielectric layer of oxide, whereas the other of these layers is in electrical contact with a counterelectrode surrounding a part of this core that is covered with a layer of solid electrolyte. This core covered with its dielectric layer, with this solid electrolyte layer, and with this counterelectrode, is encapsulated into an insulating block of resin, in the majority of cases epoxy resin.

The manufacture of such a prior art capacitor starts with the preparation of a porous body of tantalum, either cylindrical or rectangular, extended on one face by a tantalum rod. Next, a dielectric layer is formed, a layer of solid electrolyte is deposited, and then the counterelectrode is deposited. The porous body thus prepared is encapsulated in a member consisting of electrically insulating material, leaving bare a portion of the counterelectrode. Terminal conductive layers insulated from each other are deposited, respectively, in contaact with the rod and the counterelectrode. The aforementioned patent application recommends that the encapsulation be formed by molding, while masking said portion of the counterelectrode layer so as to prevent it from being completely covered.

The invention concerns in particular the preliminary phase of preparation of the porous tantalum body that is extended on one face by a tantalum wire. This porous body is also known in the capacitor art as the anode.

In the main, two techniques have been used up to now to prepare such an anode, regardless of the structures and method of manufacture of the tantalum capacitor this anode may comprise.

In accordance with a first prior art process, the anode is obtained by pressing tantalum powder to form a rectangular or cylindrical pellet; this pellet is then sintered under a vacuum at high temperature; a tantalum connection wire is electrically welded to one end. The combination of pellet and wire is then resintered under similar conditions.

In accordance with another prior art process, the anode is also obtained by pressing tantalum powder to form a rectangular or cylindrical pellet; however, the tantalum wire in this case is introduced into the pellet during pressing (embedded wire technique). The combination is then sintered in a vacuum at high temperature.

In each case, pressing and sintering occurs under adequate pressure and temperature conditions to ensure satisfactory mechanical behavior of the pellet and the wire in or on the pellet.

For high specific surface powders, it is however advisable to reduce the manufacturing temperatures and pressures of the porous tantalum pellet as much as possible in order to retain this specific surface better and to obtain a product with a high "capacity x voltage" (CV).

SUMMARY OF THE INVENTION

An object of this invention is to enable lower pressing pressures and sintering temperatures to be used than in prior art processes whilst maintaining satisfactory mechanical behavior of the wire on the pellet. Another object of the invention is to mask the ball of weld formed when a connecting wire is welded to a pellet.

In general, this invention provides a process for manufacturing a porous tantalum anode for a tantalum capacitor which is provided on one face with a tantalum connection wire, whereby the tantalum powder is pressed so as to form a pellet that is then sintered, and whereby the connection wire is added to one face of this pellet in an attachment zone, characterized in that this attachment zone is compacted locally so as to form a cavity.

In accordance with an initial embodiment of the process of this invention, compacting takes place during pressing. This compacting can take place just after the connection wire has been introduced into the pellet (embedded wire technique). This compacting can also be followed by a welding operation during which the wire is added to the pellet and the cavity is filled with the weld. This latter procedure has the advantage of eliminating the burrs of welds known hitherto, which have protruded above the face of the anode to which the wire is welded.

In accordance with another embodiment of the process of this invention, said attachment zone is compacted by impact after an initial sintering phase, but before welding the connection wire.

The invention also proposes a porous tantalum anode for a tantalum capacitor comprising a sintered porous tantalum pellet to one face of which a connection wire is added at an attachment zone, characterized in that this pellet comprises a cavity in this attachment zone.

The invention generally leads to local densification of the pellet wher the connection wire is added, thus improving its mechanical behaviour.

In addition, the cavity, generally accompanied by a local increase in density, can be filled with the weld, enabling the welded wire anodes generally to be shortened, thus, for a given length, increasing the CV factor of the anode.

BRIEF DESCRIPTION OF THE DRAWINGS

Objects, characteristics and advantages of the invention emerge from the following description, given as non-limitatory examples, in relation with drawings appended on which.

DESCRIPTION OF THE PREFERRED EMBODIMENTS

Figure 1:
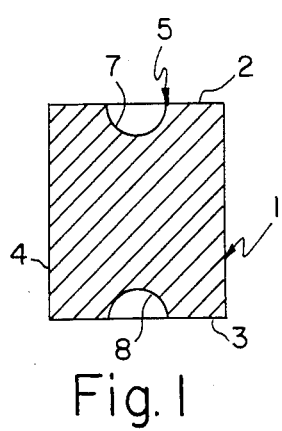
FIG. 1 is a sectional view of a porous tantalum pellet of this invention after pressing and compacting.
Figure 2:
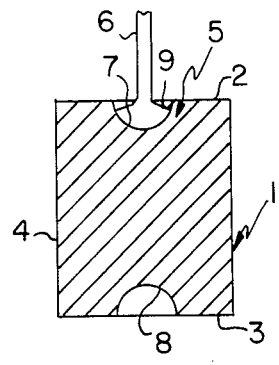
FIG. 2 is a sectional view after welding a connection wire to the pellet of FIG. 1.

FIGS. 1 and 2 represent successive phases in the manufacture (according to the welded wire technique) of a porous tantalum anode for a tantalum capacitor, for example of the solid electrolyte type with neither ribbon nor output wire, as described in the above-indicated U.S. patent application Ser. No. 933,404.

In FIG. 1, a pellet 1 is pressed of tantalum powder of geometrically single form, in most cases rectangular or cylindrical. Pellet 1 comprises two parallel faces 2 and 3 and a side wall 4, which is cylindrical or formed into flats, in practice four flats.

During this pressing phase, this pellet 1 is compacted locally so as to locally increase the density of a zone 5 in which a connection wire 6 is to be added. This local densification, performed by any appropriate tool, results here in the formation of a rounded cavity 7. For reasons of symmetry and to facilitate manufacture, the densification is carried out on the two opposed faces 2 and 3 of pellet 1, forming in addition to cavity 7 a similar cavity 8 opposite cavity 7.

In a variant, not separately represented on the drawings, only zone 5 for the attachment of wire 6 to the pellet 1 is densified, with the formation of cavity 7 only.

Cavities 7 and 8 can be of any appropriate geometry, ovoid, paraboloid, parallelepipede or as a narrow recess in particular.

An initial sintering phase (or presintering phase) is then carried out in a vacuum at high temperature, after which a connection wire 6 is added to the pellet 1 by electrical welding. The drop of weld 9 that forms at least partly fills cavity 7, without any superfluous protuberance above the plane of face 2. A second sintering phase is then carried out.

As a preferential example, cavity 7 is hemispherical with a radius approximately equal to the diameter of the tantalum wire 6 to be welded.

Figure 3:
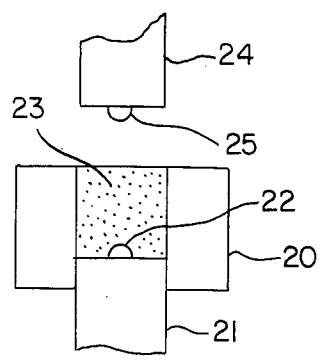
FIG. 3 is an axial sectional view of a tool adapted for preparing the pellet of FIG. 1.

FIG. 3 shows tools for pressing the pellet of FIG. 1. They consist of a die-plate 20, the internal section of which corresponds to the section of the pellet 1 to be manufactured. The lower part of this die-plate 20 is closed by a lower punch 21 provided with a protuberance 22, the volume of which is the counterpart to the cavity to be formed. The volume delineated by die-plate 20 and the lower punch 21 is filled with tantalum powder 23. Above this volume, in the extension of the lower punch 21 is a top punch 22 which is also equipped with a protuberance 25. The pressing takes place by bringing these two punches 21 and 22 relatively together.

Figure 4:
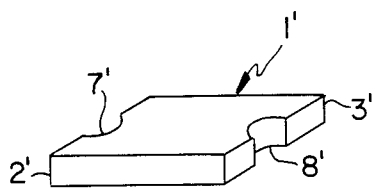
FIG. 4 is a perspective view of another porous pellet of very flat form.

FIG. 4 shows a pellet 1' of general rectangular and highly flat shape having two opposed faces 2' and 3' in which two cavities 7' and 8' are arranged, in this case in semi-cylindrical form. The radius of these cavities 7' and 8' is preferably equal to the diameter of the tantalum wire to be welded into the cavities.

Figure 5:
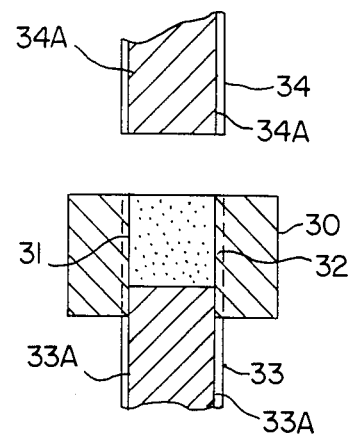
FIG. 5 is an axial sectional view of a tool adapted for preparing the pellet of FIG. 4.

FIG. 5 shows an example of tools adapted to the forming of such pellets 1'. These tools comprise a die-plate 30 of rectangular internal section with two protruding ribs 31 and 32. Two punches, respectively a lower punch 33 and an upper punch 34, equipped with slots 33A and 34A complementary to the ribs, are provided for the pressing operation.

In accordance with a variant of the process according to this invention, also applicable in the case of the welded wire embodiment, the pressing and the first sintering is carried out normally, and only subsequently, before the welding phase, the desired compacting is carried out by impact, forming a cavity or recess.

Figure 6:
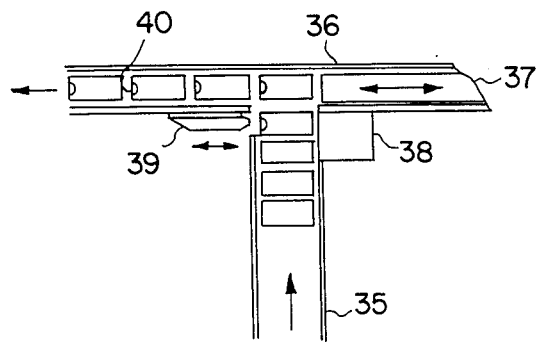
FIG. 6 is a top view of a tool for compacting pellets already pressed.

FIG. 6 shows a top view of a tool adapted for such compacting between the two sintering phases. This tool comprises a vibrating tank from which emerges a guiding chute 35 in which the pellets circulate, arranged transversely. This guiding chute is connected at right angles to a second chute 36 where the pellets circulate arranged longitudinally under the action of an acutating cylinder 37, and move toward a welding station, not represented. Just before the point of connection of the two chutes 35 and 36, the pellets go through a support blank 38 and a punch 39, undergoing a reciprocating transverse motion. This action thus forms a cavity 40 in each pellet passing between this blank and this punch.

Figure 7:
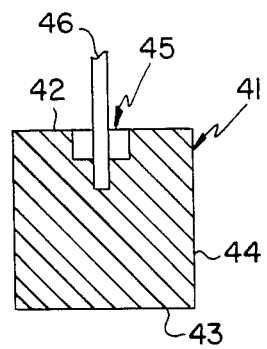
FIG. 7 is a sectional view of a porous pellet in which a tantalum wire is embedded.

FIG. 7 illustrates an anode obtained in accordance with another embodiment of this invention according to the embedded wire technique. As before, this anode comprises a pellet 41 with two opposed surfaces 42 and 43, one lateral surface 44 and a zone 45 for attaching a wire 46 for connecting to the pellet.

The manufacturing stages of this anode are illustrated in FIGS. 8A to 8D. First, a volume delineated laterally by a die-plate 50 and at the bottom by a bottom punch 51 (see FIG. 8A) is filled with tantalum powder.

Figure 8A:
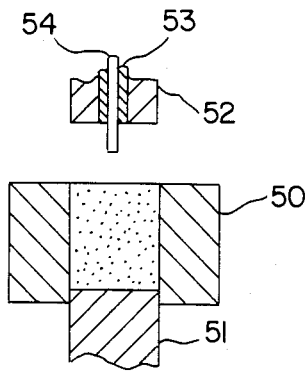
FIGS. 8A to 8D present four successive stages in the preparation of the pellet of FIG. 7.
Figure 8B:
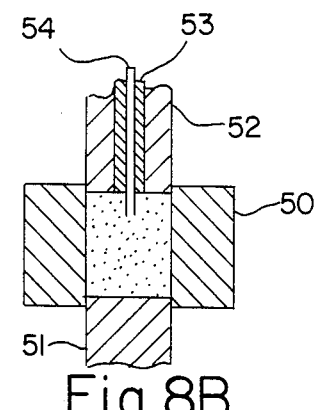
Figure 8C:
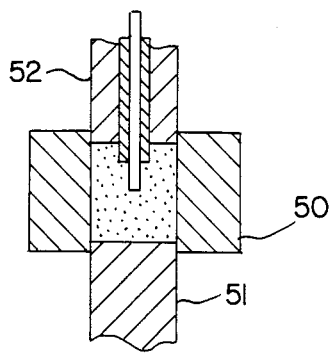
Figure 8D:
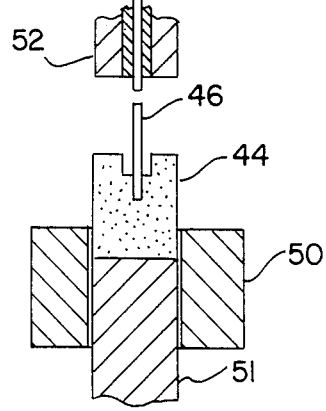

Aligned with this bottom punch 51, an upper punch 52 is arranged in which a mobile tube 53 can slide vertically, with relation to which a tantalum wire 54 (to be used to form the wire 46 of FIG. 7) protrudes downwards. This mobile tube 53 is first retracted within the upper punch 52; it is in this configuration that the punch 52 is lowered so as to comprss the powder (FIG. 8B). In a third phase (FIG. 8C), the mobile tube 53 is brought to a position lower than punch 52 so as to locally compact the pellet, forming a cavity, whilst at the same time embedding one end of wire 54.

Finally, punch 52 is raised (FIG. 8D), wire 54 is cut ot leave wire 46 embedded in the pellet 44, and the pellet is ejected by the lower punch. A new cycle can then start.

The cylindrical cavity preferably has a diameter of from two to three times the diameter of wire 54 and a height of one to two times this diameter.

Next, a sintering operation under vacuum and at high temperature is performed.

As a variant, not represented, the cavity is rectangular or rounded (spherical, avoid or paraboloid . . . ).

Manifestly, the aforegoing description is given only as a non-limitatory example and numerous variants can be proposed by the man of the art without goind beyond the framework of the invention.

What is claimed is:

1. A method of manufacturing a porous tantalum anode for a tantalum capacitor provided on one face with a tantalum connection wire, whereby tantalum powder is pressed so as to form a pellet that is then at least partially sintered, and whereby said connection wire is inserted into one face of said pellet in an attachment zone characterized in that said zone for attaching said wire to said pellet is compacted locally during pressing so as to form a cavity around said wire and said wire is added by welding totally within said cavity.

2. The method of claim 1 characterized in that said attachment zone is compacted by impact following an initial sintering phase, that said connection wire is welded (6), at least partly filling said cavity, and then that a second sintering phase is performed.

3. A porous tantalum anode for a tantalum capacitor comprising a sintered porous tantalum pellet on one face of which is added a connection wire which extends into said pellet on an attachment zone, characterized in that said pellet comprises a cavity at said attachment zone which cavity surrounds said wire and is no more than filled with a weld securing said wire to said pellet.

* * * * *